C. B. WESTERMAN.
AEROPLANE.
APPLICATION FILED NOV. 22, 1911.

1,028,409.

Patented June 4, 1912.

3 SHEETS—SHEET 1.

Witnesses

Inventor
Charles B. Westerman,
By Joshua R. H. Potts
Attorney

C. B. WESTERMAN.
AEROPLANE.
APPLICATION FILED NOV. 22, 1911.
1,028,409.
Patented June 4, 1912.
3 SHEETS—SHEET 2.
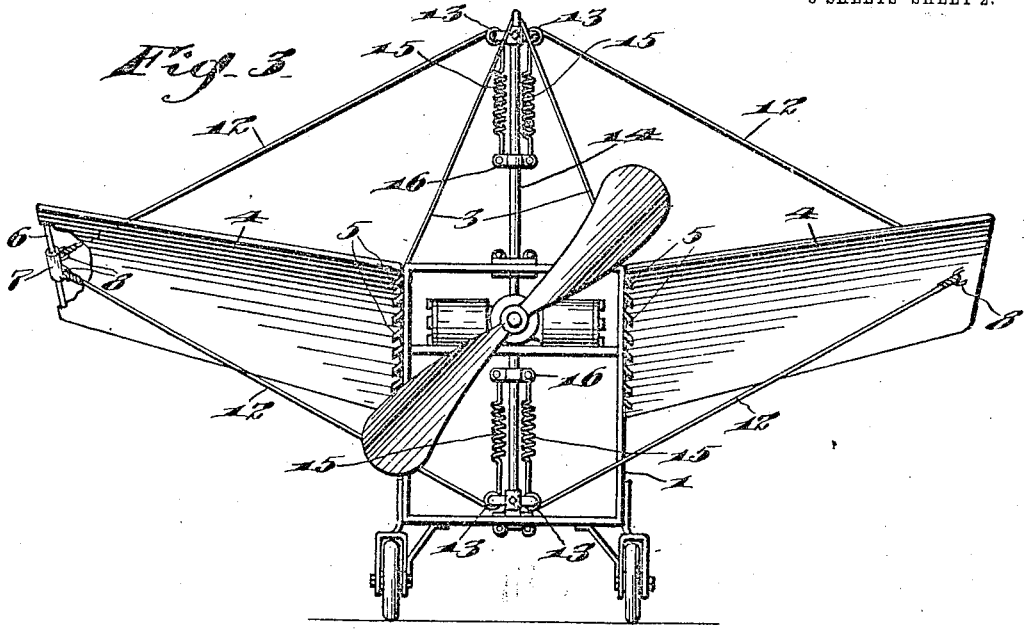
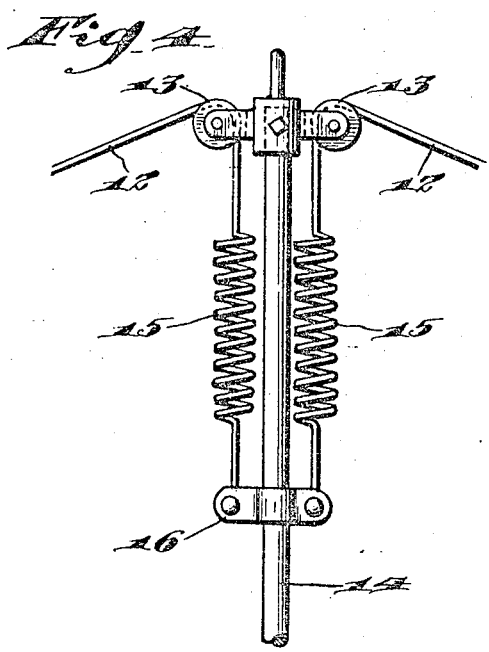
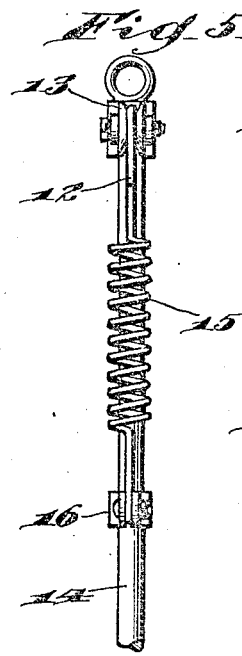
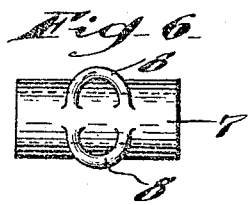
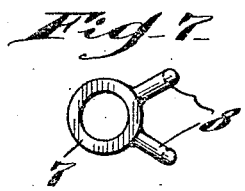
Witnesses
Inventor
Charles B. Westerman,
By Joshua R. H. Potts,
Attorney

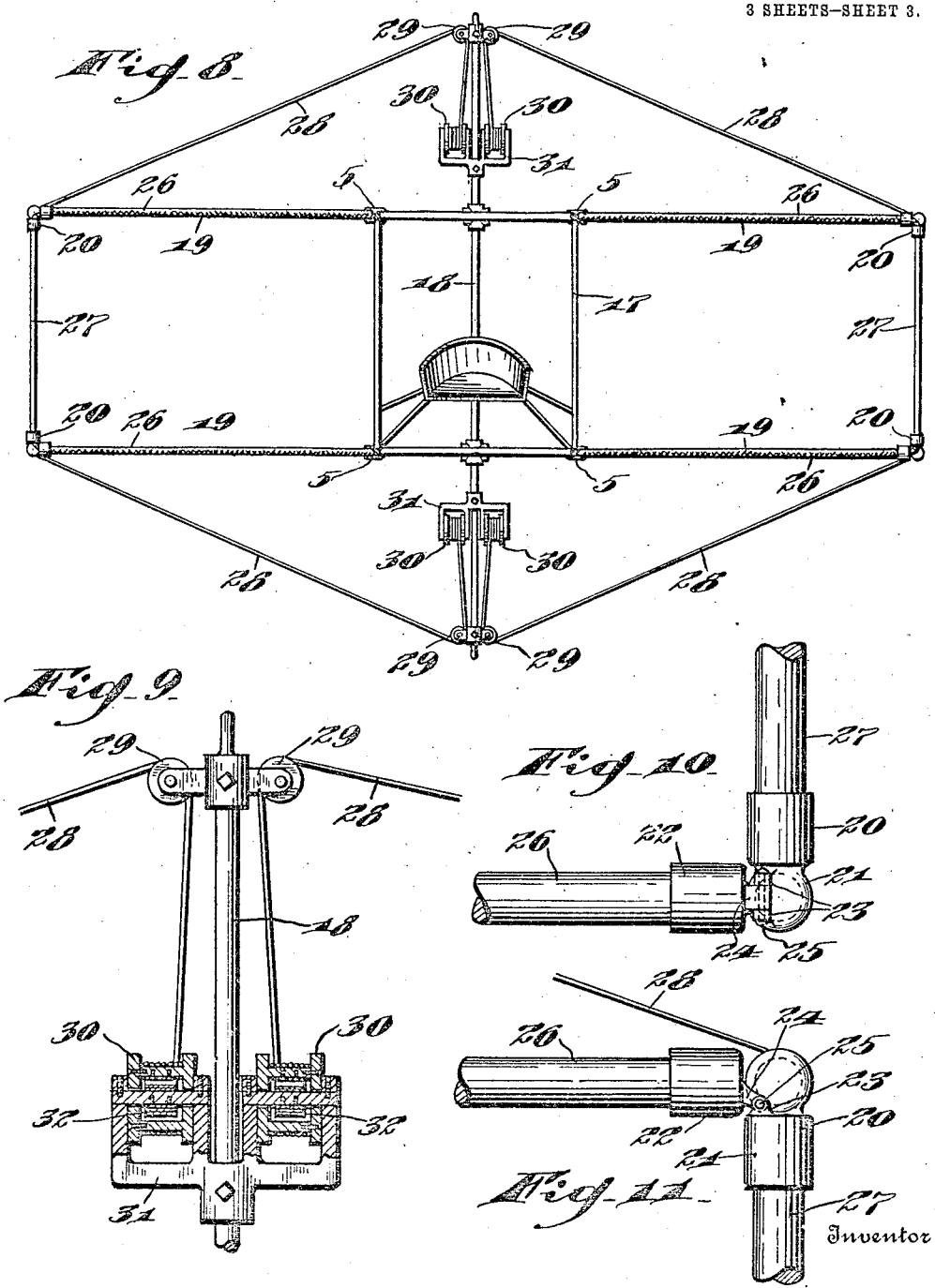

UNITED STATES PATENT OFFICE.

CHARLES BECK WESTERMAN, OF COLUMBIA, PENNSYLVANIA.

AEROPLANE.

1,028,409.

Specification of Letters Patent.

Patented June 4, 1912.

Application filed November 22, 1911. Serial No. 661,747.

*To all whom it may concern:*

Be it known that I, CHARLES B. WESTERMAN, a citizen of the United States, residing at Columbia, in the county of Lancaster and State of Pennsylvania, have invented certain new and useful Improvements in Aeroplanes, of which the following is a specification.

My invention relates to improvements in aeroplanes, the object of the invention being to provide an improved hinged and elastic mounting for the wings or planes, which will permit the wings or planes to move when struck by a sudden gust of wind, and quickly resume their normal position, preventing accident.

A further object is to provide an aeroplane with laterally projecting wings or planes, having hinged connection with an intermediate frame, and braced by spring held stay wires connected above and below the planes adjacent their outer ends, whereby the outer ends of the planes are allowed independent upward and downward movement within certain limits, but normally held against movement, and only operated by sudden gusts of wind.

A further object is to provide improved means for holding the planes of airships either of the monoplane or biplane type, which will allow elastic movement of said planes.

With these and other objects in view, the invention consists in certain novel features of construction, and combinations and arrangements of parts, as will be more fully hereinafter described and pointed out in the claims.

Figure 1:
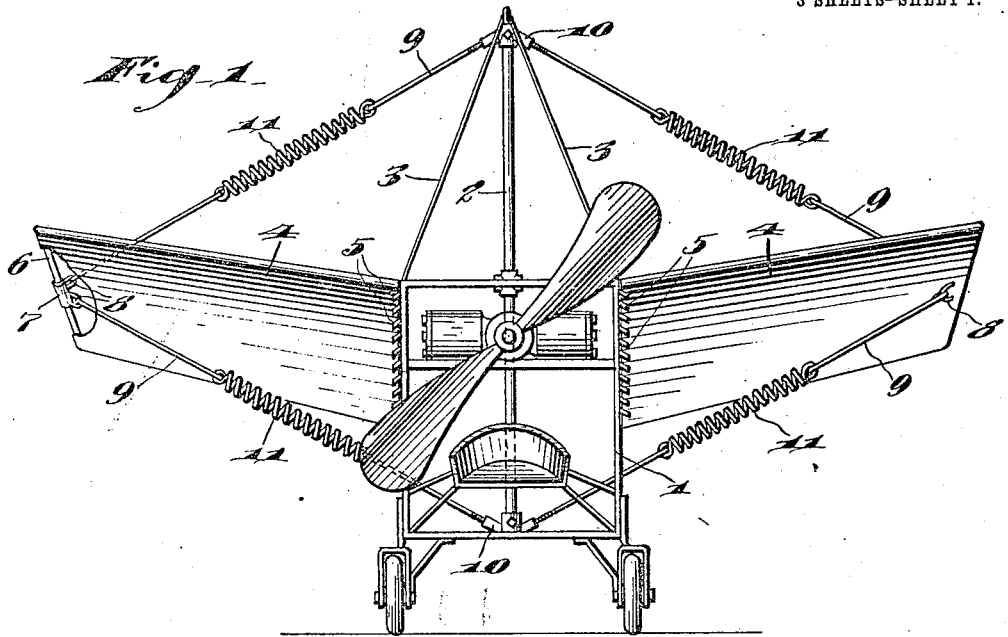
Figure 2:
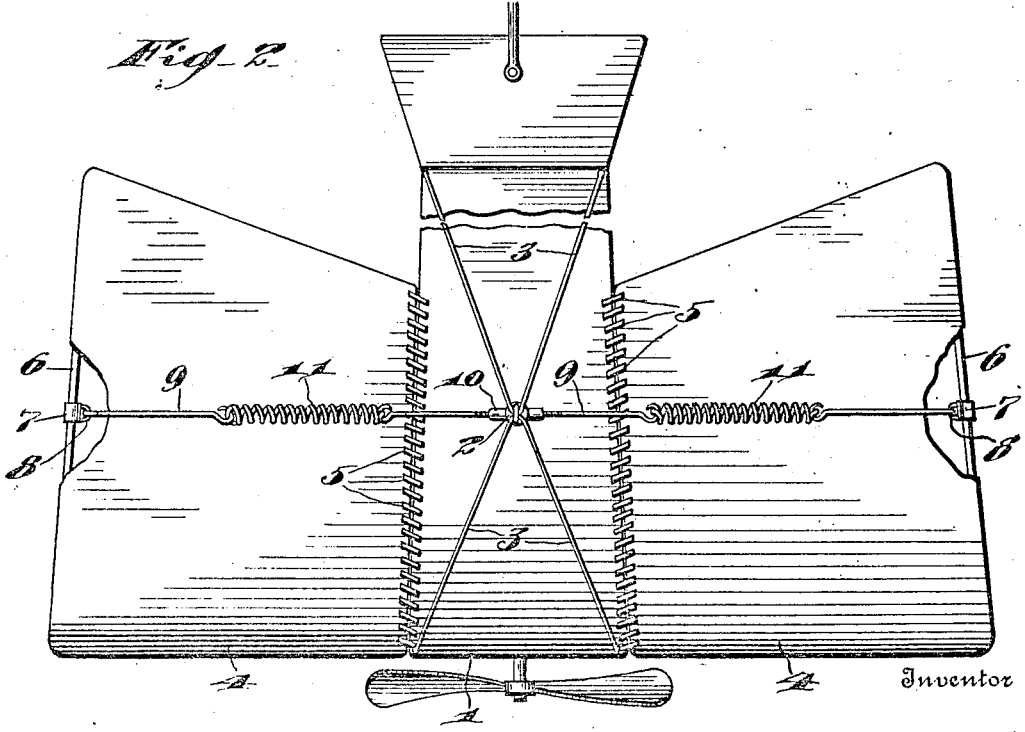

In the accompanying drawings: Figure 1, is a view in front elevation illustrating one form of my improvements showing one of the planes partly broken away. Fig. 2, is a broken plan view of Fig. 1. Fig. 3, is a view similar to Fig. 1, illustrating a modification. Figs. 4, 5, 6, and 7, are views of details of the construction shown in Fig. 3. Fig. 8, is a view similar to Fig. 1 illustrating another modification in which my improvements are illustrated in connection with a biplane, and Figs. 9, 10, and 11, are views illustrating details of the construction shown in Fig. 8.

1, represents a fore-and-aft frame which is provided centrally with a vertical post 2, which is braced by suitable stays 3.

4, 4, represent the wings or planes which project laterally from the frame 1, and have a hinge connection therewith. This hinge connection may be made in various ways. I have shown a simple lacing 5 which serves to connect the plane and frame, and allow hinged movement of the planes. The outer rods 6 of the frame of the planes 4 have metal sleeves 7 secured thereon, and these sleeves are made with eyes 8 positioned at an angle to each other, one eye projecting above the plane, and the other below the plane. Stay wires 9 connect the eyes 8 with metal brackets 10 fixed to the respective ends of posts 2, and these stay wires 9 are provided between their ends with coiled springs 11. The four coiled springs are of the same strength, so that the planes are held in their normal position and return to the normal position when they are moved out of such positions by sudden gusts of winds. In other words, if the machine when in flight encounters a squall or sudden gust of air which strikes one plane, this plane will move upwardly or downwardly as the case may be, so as to accommodate itself to such air, and will then return to normal position. If the planes were rigid, the sudden gust of air would be apt to throw the machine over to one side, or up side down, and I believe my improved elastic supports, which connect the free ends of the planes with the rigid portion of the machine, permit the machine to automatically care for itself in various conditions of the air.

In the modification illustrated in Figs. 3, 4, 5, 6, and 7, my improvements are shown in connection with the same type of airship as illustrated in Fig. 1, but in this modification instead of employing the springs 11 between the ends of the stay wires, I pass the stay wires 12 over pulleys 13 at the ends of the post 14, and provide coiled springs 15 in said stay wires between the pulleys and fixed brackets 16 on the post. The springs 15 therefore perform the same function as the springs 11, allowing the wings or planes to move vertically in accordance with the air pressures.

In Figs. 8, 9, 10, and 11, I illustrate my improvements in connection with a biplane in which 17 represents a central frame to which a vertical post 18 is secured centrally and projects above and below the frame as clearly shown. To the frame 17, the parallel planes 19 are connected by couplings 20 as seen most clearly in Figs. 10 and 11.

These couplings 20 comprise two members 21 and 22. Member 21 is in the form of an elbow to receive the rods 26 and 27, which project at right angles to each other, and this member 21 is provided with parallel ears 23 to receive between them a sleeve 24 integral with member 22, and when these ears and sleeve are connected by a hinge pin 25, the members will be hinged together. Member 22 constitutes a collar to receive the end of the side bar 26 of plane 19, and the outer ends of these planes are connected to the outside frames 27 in the same manner as are the inner ends of the planes to the frame 17. In other words, at all four corners of the four planes 19, couplings 20 are provided which connect the said planes with the central frame 17, and the outer frames 21, and allow these planes 19 to swing upwardly and downwardly at their outer ends, their inner ends being hinged to frame 17, and the frames 20 moving vertical with the planes. The free ends of the planes 19 have stay wires 28 secured thereto, and these stay wires 28 are passed over pulleys 29 on the ends of post 18, and are fixed to drums 30 mounted to turn in brackets 31 on the post. In these drums 30, convolute springs 32 are located, and exert a normal pull upon the stay wires to hold the planes in their normal positions, yet allow the planes to move vertically in accordance with the gusts of wind, and return to normal positions when said gusts of wind have passed. It will therefore be noted that with the several forms of my invention, elastic supporting means are provided above and below the free ends of the planes, and said planes are hinged at their inner ends, so that they are held in their normal position for flight by reason of the balancing action of their spring holding members. The planes are therefore sensitive to differences in pressure and velocity of the air, and will move independently within certain limits, so as to care for such inequalities in the air pressure and velocity, and operate to maintain an automatic equilibrium.

Various other slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. An aeroplane comprising a rectangular central frame, laterally projecting planes having hinged connection at their inner ends to the upper end of said central frame, and elastic stays connecting the outer ends of said planes above and below with said frame, said stays so connected as to permit each plane to move entirely independent of the other plane, substantially as described.

2. An aeroplane comprising a rectangular central frame, an upwardly projecting post on the frame, laterally projecting wings having hinged connection at their inner ends to the upper end of said frame, spring stays connecting the upper end of said post with the outer ends of said planes, and other spring stays connecting the outer ends of said planes with said frame, said stays so connected as to permit each plane to move entirely independent of the other plane, substantially as described.

3. An aeroplane comprising a central rectangular frame, laterally projecting planes having hinged connection at their inner ends to the upper end of said frame, elastic means supported by the frame and connected to the outer ends of the planes above and below the planes, said stays so connected as to permit each plane to move entirely independent of the other plane, substantially as described.

In testimony whereof I have signed my name to this specification in the presence of two subscribing witnesses.

CHARLES BECK WESTERMAN.

Witnesses:
 JOSEPH F. BITTNER,
 HARRY T. HALL.